Dec. 22, 1931.    F. C. CHAPMAN    1,837,357
EGG HANDLING APPARATUS
Filed June 18, 1929    2 Sheets-Sheet 1
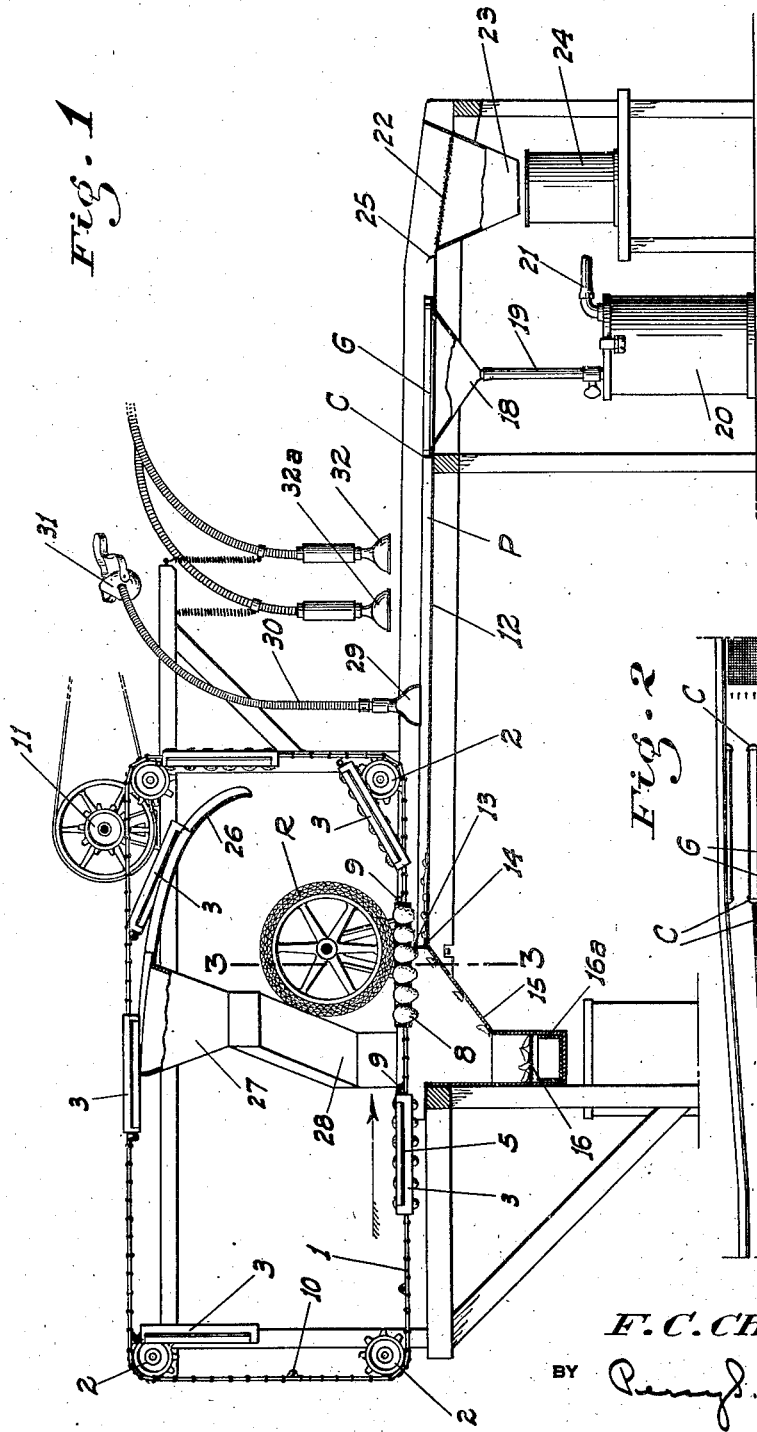
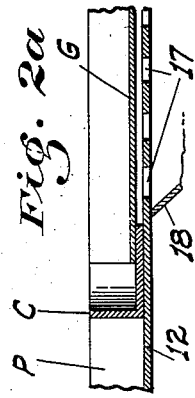
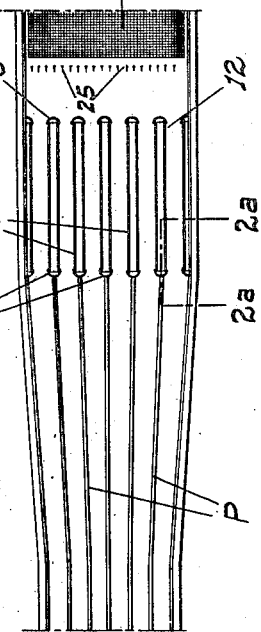
INVENTOR
F. C. Chapman
BY
ATTORNEY Dec. 22, 1931.  F. C. CHAPMAN  1,837,357
EGG HANDLING APPARATUS
Filed June 18, 1929  2 Sheets-Sheet 2
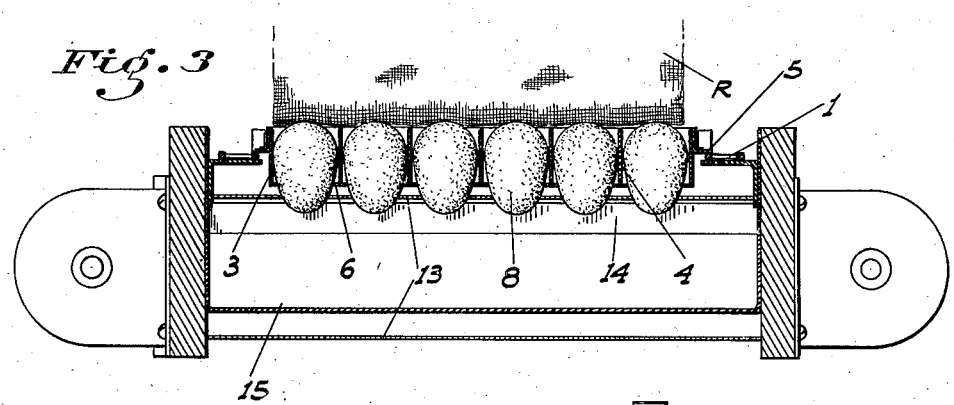
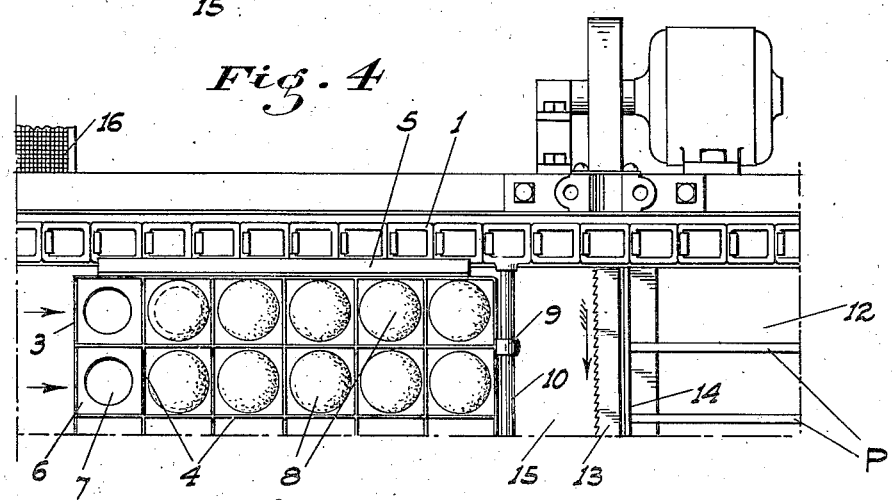
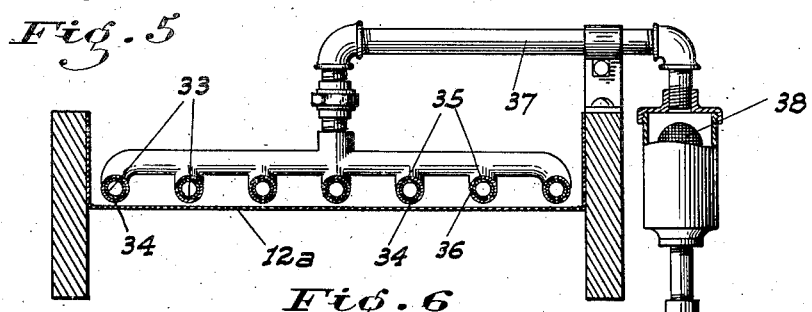
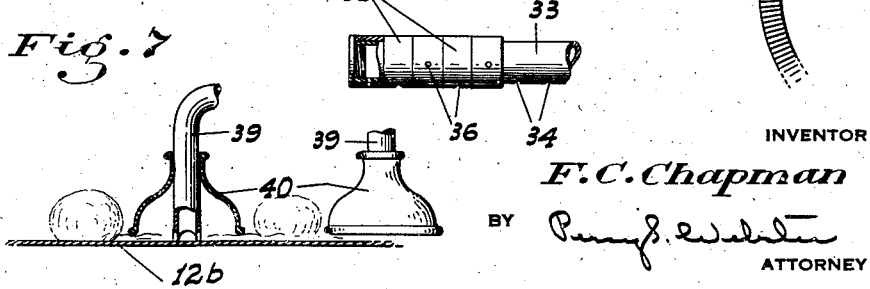
INVENTOR
F. C. Chapman
BY
ATTORNEY Patented Dec. 22, 1931

1,837,357

UNITED STATES PATENT OFFICE

FRANK C. CHAPMAN, OF MODESTO, CALIFORNIA

EGG HANDLING APPARATUS

Application filed June 18, 1929. Serial No. 371,794.

This invention relates to devices for separating the whites from the yolks of eggs. In certain industries such as the baking and confectionery industries great quantities of eggs are used in preparing the products, but whether only the whites or the yolks are used, or both, they are usually employed separate from each other. A considerable business has therefore developed in supplying egg whites only to those desiring them, or similarly only the yolks, so that no waste is involved in the use of eggs for the particular purpose and the users do not themselves have to go to the trouble of making the necessary separation.

At present the only method in use, as far as I am aware, in thus preparing the eggs for these industries is breaking the shells by hand and subsequently separating the yolks from the whites by hand also. This is obviously a somewhat slow and relatively costly method of procedure.

The principal object of my invention is to eliminate this slow and crude method by providing a machine by means of which the shells of a plurality of eggs will be broken through simultaneously, to allow the contents of the eggs to escape from the shells; and the whites and yolks are then automatically separated from each other and from the shells.

The capacity of even a small machine constructed according to my invention is such that the services of one or at the utmost two operators is sufficient to accomplish what previously called for the services of a dozen or more operators. Also once the machine is built and in operation the cost of upkeep and operation is very little compared with that of manual labor, besides accomplishing the results in a more efficient manner and in but a fraction of the time previously necessary.

The machine also lends itself to very sanitary operation, since it is easily cleaned whenever necessary, and the eggs, from beginning to end, need never be touched by human hands.

These objects I accomplish by means of such structure and relative arrangement of parts as will fully appear by a perusal of the following specification and claims.

In the drawings similar characters of reference indicate corresponding parts in the several views:

Fig. 1 is a longitudinal section of the complete apparatus as in operation.

Fig. 2 is a top plan view of the egg receiving table showing the discharge outlets for the whites and the yolks.

Fig. 2a is a fragmentary enlarged section on the line 2a—2a of Fig. 2.

Fig. 3 is an enlarged fragmentary cross section on the line 3—3 of Fig. 1.

Fig. 4 is an enlarged fragmentary top plan view of the apparatus adjacent the plane of the saw.

Fig. 5 is a cross section showing a modified suction arrangement for the egg whites.

Fig. 6 is a fragmentary longitudinal elevation of one of the pipes of such arrangement.

Fig. 7 is a sectional view of still another modified form of suction device.

Referring now more particularly to the characters of reference on the drawings, and particularly at present to Figs. 1 to 5, the numeral 1 denotes a pair of endless transversely spaced chains which pass about direction changing sheaves 2 so that the chain is substantially rectangular in form from end to end with its runs disposed in horizontal and vertical planes. The chains are spaced apart sufficiently to receive egg containers 3 therebetween, which containers are subdivided by partitions 4 into a number of individual egg compartments arranged so as to be symmetrical with the partitions of an ordinary egg carton.

Flanges 5 project from the sides of the containers to rest on the chains when said containers are disposed along the lower horizontal runs of the same. The bottom plate 6 of the container is provided with orifices 7 in the different egg compartments of sufficient size to enable the small ends of the eggs 8 to project therethrough a certain distance but not the entire egg. The containers at one end are provided with transversely spaced hooks 9 or the like adapted to detachably engage transverse rods 10 extending between the chains at longitudinally spaced intervals greater than the length of the containers.

The containers are thus moved along by and with the chains, which are driven at a predetermined speed by suitable means such as sprockets 11 engaging the outer sides of the upper runs or at any other convenient points, and themselves driven in any manner desirable.

The containers when riding on the lower runs of the chains are disposed so that the lower projecting ends of the eggs are then spaced slightly from a table 12 which extends lengthwise of the chains at a downward slope to a point a considerable distance beyond said chains in the direction in which the latter are being driven.

Disposed intermediate the ends of the chains and above the table is the upper run of a transversely extending endless driven band saw 13 or similar cutting means, the toothed or cutting edge of which faces in the direction from which the chains and the containers are moving. Said upper run of the saw is disposed so as to be in the horizontal plane of the end portions of the eggs depending below the containers as shown in Figs. 1 and 3. The lower portions of the egg shells are thus cut off by the saw as the containers move over the same, the contents of the eggs discharging of themselves beyond the saw onto the table.

To prevent the eggs from possibly being dislodged in an upward direction when the saw engages the same a relatively large roller R faced with felt or similar yieldable material is mounted for free rotation directly above the plane of the saw to engage all the eggs in any transverse row of the container as said eggs are acted on by the saw.

The portions of the shells cut off by the saw are prevented from passing onto the table to mingle with the egg contents by means of a transverse partition or divider 14 which extends across and projects upwardly from the table at a suitable location adjacent the back of the saw. The shells drop ahead of the partition and saw and are conveyed away from the vicinity of the saw and partition by suitable means such as a draper or an inclined apron 15 leading to a screen-bottomed discharge trough or chute 16. Under the screen is a receptacle 16a to catch any egg white which may remain in the cut-off shell portions, and which in the aggregate, is worth saving.

The table, from the partition 14 to a point some distance beyond the chains, is divided into a number of longitudinal troughs, one for each longitudinal row of eggs in the container, by partitions P. Beyond each partition and longitudinally alined therewith, is a row of holes 17. All the rows of holes discharge in common into a funnel 18 below the table which has air-tight connection with the table about the holes and with a suction hose 19 depending therefrom. This hose 19 also has an air-tight fit with the top of a receptacle 20, from which a suction pipe 21 leads to any suitable suction pump or the like.

The egg contents from each longitudinal row in the container 3, drop into the corresponding table-trough, the yolks retaining their rounded shape, while the whites assume the form of a thin film or layer spread more or less evenly over the bottom area of the trough. To prevent the yolks from possibly being broken and drawn through the holes 17, it is necessary to guard the yolks from coming close to the holes without interfering with the passage of the whites to the same. This is done by means of longitudinal guard members G, one for each row of holes 17, and wider than the holes. These members are preferably of channel form, which removably seat in end cradles C fixed on the table, and which also hold the bottoms of the guards clear of the bottom of the table, as shown in Fig. 2a.

The partitions P terminate at the forward cradles C, and since it is desirable that the space between adjacent guards be as wide as the initial spacing of the partitions (which are narrower or thinner than the guards), the table increases in width toward its rear end, and the partitions similarly diverge from each other, as shown in Fig. 2. The cradles are rounded at their outer ends, so as to permit of the ready flow of the yolks therepast. The removability of the guards enables the holes below to be readily flushed out whenever necessary.

Beyond the holes 17 and guards another and somewhat longer and preferably screen covered opening 22 is provided in the table which delivers into a receptacle 24 removably mounted thereunder. Across the front end of the opening 22 a row of upstanding sharp pointed prongs or needles 25 is mounted. The table from the prongs toward its adjacent end preferably has a steeper slope than over the remainder of its length so as to speed the movement of the yolks into the hopper 23 through the screened opening.

In operation the egg whites and the yolks flow gradually down the table due to the slope of the latter and the natural fluidity of the whites. As the whites pass under the guards and over the holes 17 they are acted on by the action in the funnel and hose below and are drawn through the holes and deposited in the receptacle. The yolks however being in an unbroken and unitary form and kept from adjacent the holes, are not affected by the suction and pass between the guards to the outlet 22. As the yolks reach said outlet they come in contact with the prongs 25 which pierce the surface film of the yolks and cause them to collapse, so that they will then drain freely through the outlet into the receptacle 24 below.

The major portions of the shells remain in the containers and are disposed of in the following manner: As the chains pass about the lower direction changing sheaves beyond the saw the containers whose hooks are still engaged with the chain rods are of course raised. As the chains then pass about the upper direction changing sheaves the free ends of the then vertically hanging containers engage a fixed and substantially horizontal apron 26 which leads to a hopper 27 connected with a discharge chute 28. This apron is arranged under the upper run of the chains so as to cause the containers to assume a substantially horizontal but inverted position. As the containers then pass over the hopper therefore the shells will drop from the containers into the hopper from which they are carried away by the discharge chute. The containers passing beyond the hopper again assume their vertically depending position. They are then removed in order to allow other cartons of eggs being placed therein which is done by placing the container in cooperating inverted relation to the carton and then inverting the position of the members to cause the eggs to change places from the carton to the container.

In order to enable any spoilt egg being removed from the remainder which are passing down the table, a hood 29 is mounted in connection with the table and of such a size and shape that it may be projected into any table-trough. A flexible hose 30 projects upwardly from the hood and terminates in a nose attachment 31 adapted to be strapped to the head of the operator standing alongside the table so that he may readily detect any spoilt or unnatural odor emanating from any egg passing under the hood.

An adjustable suction nozzle 32 is positioned convenient to the operator wearing the odor detecting device and is arranged to be lowered to engage the table over any spoilt egg thus detected so that the same may be immediately removed from association with the remainder of the egg contents.

It is possible that a yolk may break when dropping out of the shell. An additional manually operable suction nozzle 32a is therefore provided for the use of the operator, so that any such broken yolk may be removed from its trough and saved without danger of the same becoming permanently mixed with the whites when drawn through the holes 17.

Other forms of suction device for removing the whites from the table may be employed besides that shown. One such other form is illustrated in Figs. 5 and 6 and comprises a number of transversely spaced longitudinally extending pipes 33 disposed just above the table 12a and each having a row of holes 34 along its lower edge to enable the whites to be sucked up from the table. Each pipe also preferably has a number of collars 35 turnable thereon, one for each hole 34 and each collar having itself a hole 36 to aline with the corresponding hole 34. This enables any number of holes to be shut off if desired according to the quantity of whites flowing along the table, or to suit any conditions of operation which may obtain at the time.

This battery of pipes is connected in common with a suction pipe 37 having a strainer device 38 interposed thereon to prevent any egg shell fragments which may possibly be sucked through the holes 34 from passing along the suction pipe to its termination.

Still another suction device comprises a plurality of individual vertical pipes 39 open at their lower ends which face and are close to the table 12b as shown in Fig. 7. About each said pipe is a flexible cup 40, to prevent the yolks coming in direct contact with the pipes and being possibly drawn into the relatively large open ends of said pipes.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An egg separator including an egg container arranged to cause only the ends of the eggs to depend therebelow, means for moving the container horizontally, means for cutting off the depending ends of the egg shells whereby to allow the contents of the eggs to drop therefrom, a table onto which said contents fall, and means associated with the table for segregating the whites of the eggs from the yolks.

2. An egg separator including an egg container arranged to cause only the ends of the eggs to depend therebelow, means for moving the container horizontally, means for cutting off the depending ends of the egg shells whereby to allow the contents of the eggs to drop therefrom, a table onto which said contents fall, and means associated with the table for withdrawing the whites of the eggs from the table while leaving the yolks undisturbed thereon.

3. An egg separator including an egg container arranged to cause only the ends of the eggs to depend therebelow, means for moving the container horizontally, means for cutting off the depending ends of the egg shells whereby to allow the contents of the eggs to drop therefrom, a table onto which said contents fall, means associated with the table for withdrawing the whites of the eggs from the table while leaving the yolks undisturbed thereon, and means for subsequently removing the yolks from the table.

4. An egg separator including a table adapted to receive and support the contents of eggs, means associated with the table for withdrawing the whites of the eggs from the table while leaving the yolks undisturbed thereon, means for subsequently puncturing the surface film of the yolks, and a discharge opening in the table through which the punctured yolks then pass.

5. An egg separator including a table adapted to receive and support the contents of eggs, and suction means associated with the table for withdrawing the whites of the eggs from the table without affecting the yolks.

6. An egg separator including a table adapted to receive and support the contents of eggs, a guarded opening in the table intermediate its ends arranged to allow the whites of the eggs but not the yolks to pass over the same, and suction means applied to said opening from below the table.

7. A structure as in claim 17, with means for keeping the shell portions as they are cut off, segregated from the contents of the eggs.

8. An egg separator including a table, means for conveying a plurality of eggs along the table simultaneously, means for acting on the eggs simultaneously to cause the contents thereof to be discharged onto the table, and means associated with the table for separating the whites of the eggs from their yolks.

9. An egg separator including a table, a support for a plurality of eggs disposed above the table, means for cutting the shells of the eggs to cause the contents thereof to be discharged onto the table, and means associated with the table for separating the whites of the eggs from the yolks thereof while they are disposed on the table.

10. An egg separator including an egg container arranged to cause only the ends of the eggs to depend therebelow, means for moving the container horizontally, a horizontal transverse saw mounted above the table in the plane of the depending portions of the eggs ahead of the direction of movement of the eggs and facing the same whereby the shells will be cut through with the advancing of the container and a table onto which the contents of the eggs drop after the shells are thus cut.

11. A structure as in claim 10, with a transverse partition upstanding from the table adjacent the saw to cause the shell portions cut off to be segregated from the discharged contents of the eggs.

12. A structure as in claim 10, with a transverse partition upstanding from the table adjacent the saw to cause the shell portions cut off to be segregated from the discharged contents of the eggs, and means for conveying said shell portions away from the vicinity of the saw and partition.

13. A structure as in claim 17, with means arranged in connection with the container moving means for causing the shell portions remaining in the container to be subsequently and automatically discharged therefrom.

14. An egg separator including an egg container arranged to cause only the ends of the eggs to depend therebelow, an endless flexible conveyor unit disposed in a vertical plane, direction changing sheaves about which said unit passes, means for driving said unit, the container being arranged to rest on the upper side of the lower run of the unit; means for detachably connecting the forward end of the container to the unit to cause the two to travel together, means for cutting off the depending ends of the egg shells as the container moves along with the lower run of the conveyor, a table adjacent but under the lower run of the unit onto which the contents of the eggs drop as the shells are cut, and means to cause the container to be inverted as it reaches the upper run of the unit to cause the egg shells remaining therein to drop therefrom.

15. A structure as in claim 14, in which said last named means comprises a guide apron positioned under the upper run of the conveyor unit to engage and support the free end of the container as its conveyor attached end passes from the vertical run of the unit to the upper run of the same to cause the container to assume a substantially horizontal but inverted position, and a discharge hopper for the reception of the shells to which said apron leads at its forward end relative to the direction of movement of said upper run of the unit.

16. An egg handling apparatus including an egg container to support eggs with their ends depending therefrom, means for moving the container horizontally, and cutting means arranged in the path of movement of the container and in the plane of the ends of the eggs for cutting off the latter.

17. An egg handling apparatus including an egg container, means in the container to support eggs so that only their ends may depend therefrom, means for moving the container horizontally, and means for cutting off the depending ends of the eggs as the container thus moves.

18. An egg handling apparatus including an egg container, means in the container to support eggs in rows and so that their ends project from the container, and means associated with the container for cutting off the egg-ends of all the eggs in a row simultaneously.

19. An egg handling apparatus including an egg container, means in the container to support eggs so that their ends project from the container, means for moving the container horizontally, and a cutting element the full width of the container disposed substantially at right angles to and in the path of movement of the container, and in the plane of the projecting portion of the egg-ends.

20. An egg handling apparatus including an egg container, means in the container to support eggs in rows and so that their ends project from the container, means for moving the container horizontally and at right angles to the rows, and a band saw the full width of the container, disposed parallel to the same as to the rows, and in the path of movement of the container and the plane of the egg-ends.

21. An egg handling apparatus including an egg container to support eggs with their ends depending therefrom, means for moving the container horizontally, cutting means arranged in the path of movement of the container and in the plane of the ends of the eggs for cutting off the latter, and means engaging the eggs while being cut to then prevent upward displacement of the same.

22. An egg handling apparatus including a table, means for conveying a plurality of eggs along the table simultaneously, and means for acting on the eggs simultaneously to cause all their contents to be discharged onto the table.

23. An egg handling apparatus including an egg container, means in the container to support eggs in rows and so that their ends project from the container, means associated with the container for cutting off the egg-ends of all the eggs in a row simultaneously, a roller above the container and disposed transversely of the path of movement thereof, the roller extending the full width of the container, and a facing of cushion material about the roller to yieldably engage the tops of all the eggs in a row simultaneously; the axis of the roller being directly above the cutting means.

24. In an egg handling apparatus, a table adapted to receive and support the contents of a plurality of eggs, a movable hood of a size substantially that of the contents of any one egg, a flexible tube projecting upwardly from the hood, and a nose attachment adapted to be removably secured to the head of an operator, mounted on the upper end of the hose.

25. An egg handling apparatus including a table, means for conveying a plurality of eggs lengthwise of and along the table simultaneously, and means for breaking the shells of all the eggs simultaneously and in a manner to cause the contents of said eggs to be discharged onto the table.

In testimony whereof I affix my signature.

FRANK C. CHAPMAN.